No. 635,475. Patented Oct. 24, 1899.
S. P. GREY.
GEARING FOR WASHING MACHINES.
(Application filed Feb. 17, 1899.)

(No Model.)

WITNESSES:
Adelaide Kearns.
Ada Crawford.

Silvester P. Grey INVENTOR.

BY Chapin & Denny
His ATTORNEYS.

THE NORRIS PETERS CO., PHOTO-LITHO., WASHINGTON, D. C.

UNITED STATES PATENT OFFICE.

SYLVESTER P. GREY, OF FORT WAYNE, INDIANA, ASSIGNOR TO THE HORTON MANUFACTURING COMPANY, OF SAME PLACE.

GEARING FOR WASHING-MACHINES.

SPECIFICATION forming part of Letters Patent No. 635,475, dated October 24, 1899.

Application filed February 17, 1899. Serial No. 705,775. (No model.)

*To all whom it may concern:*

Be it known that I, SYLVESTER P. GREY, a citizen of the United States, residing at Fort Wayne, in the county of Allen, in the State of Indiana, have invented certain new and useful Improvements in Gearing for Washing-Machines; and I do hereby declare that the following is a full, clear, and exact description of the invention, which will enable others skilled in the art to which it appertains to make and use the same, reference being had to the accompanying drawings, which form part of this specification.

My invention relates to improvements in gearing for washing-machines employing alternating rubbers or agitators.

The object of my present invention is to provide an improved operating mechanism for converting rotary motion into alternating motion in washing-machines, the said mechanism being of simple and economical construction, positive and reliable in action, and having but small liability of getting out of repair.

Another object is to provide an improved means for preventing derangement of said mechanism by an inadvertent rotation of the operating-handle in the reverse direction.

My invention consists of a pair of bevel gear-wheels in horizontal arrangement loosely mounted upon an upright agitator-shaft which is revolubly mounted in suitable bearings in a supporting-frame upon the suds-box lid and carries upon its inner or lower end a proper rubber or agitator, a bevel-pinion rigidly fixed upon the inner end of the power-shaft and adapted for a meshing engagement with the said bevel-gears, means for alternately reversing the direction of rotation of the agitator-shaft, and means for preventing rotation of the power-shaft in but one direction when in use.

The principal novel features of my invention are the improved means for alternately reversing the direction of rotation of the agitator-shaft while the power-shaft is continuously rotated in one direction and the manner of mounting the fly-wheel upon the power-shaft.

In the accompanying drawings similar reference-numerals indicate like parts throughout the several views.

Figure 1:
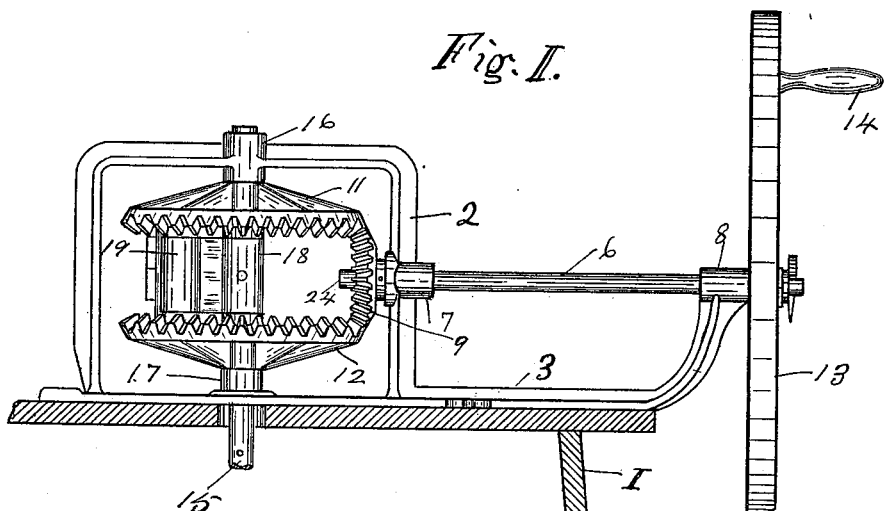
Figure 2:
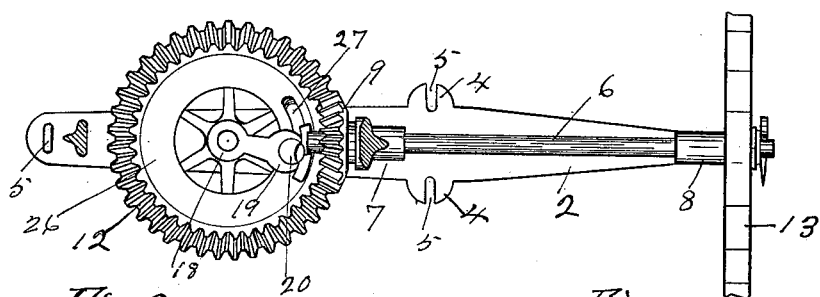
Figure 3:
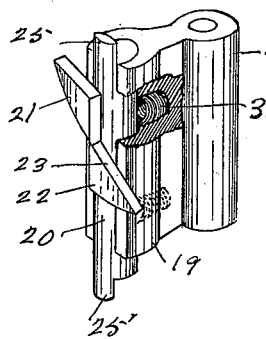
Figure 6:
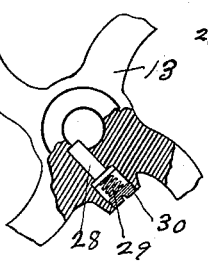
Figure 4:
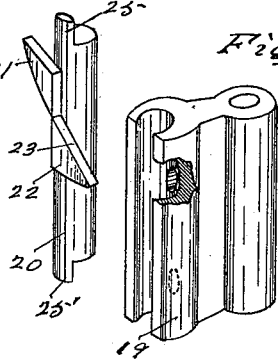
Figure 5:
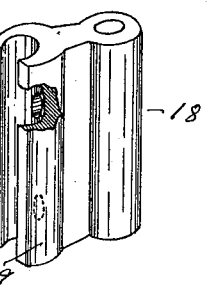

Figure 1 is a side view of my improved operating mechanism in position upon a proper suds-box, tub, or machine-body, shown only in part and showing the relative arrangement of its working parts. Fig. 2 is a plan view of the same with the upper portion of the supporting-frame cut away and the upper gear-wheel removed, showing the annular track or flange with which each of said gear-wheels is provided for the vertically-adjustable locking-plunger. Fig. 3 is a perspective detail of the means for alternately reversing the rotation of the agitator-shaft, consisting of a winged plunger adjustably mounted in a chambered or slotted casting and adapted to form a locked engagement with said gear-wheels alternately, but not simultaneously. Fig. 4 is a detail of the said plunger. Fig. 5 is a detail of the said chambered casting. Fig. 6 is a detail of the clutch mechanism of the fly-wheel hub.

The suds-box, tub, or machine-body 1, of well-understood construction, may be of any desired form or material. Upon this box or machine-body 1 is rigidly fixed the upright metallic frame 2, having an integral base 3, provided with apertured ears or lugs 4 and a slot 5 for proper holding-screws. The horizontal power-shaft 6 is rotatably mounted in suitable bearings 7 and 8 of said frame and has upon its inner end a rigid bevel-pinion 9, adapted for an actuating engagement with the bevel gear-wheels 11 and 12, and has upon its outer end a proper fly-wheel 13, having a suitable handle 14 upon its perimeter. The vertical agitator-shaft 15 is rotatably mounted in suitable bearings 16 and 17 in said frame 2 and has upon its lower and inner end a proper rubber or agitator of well-understood construction. (Not shown.) Upon the agitator-shaft 15 between the said gear-wheels is rigidly fixed a metallic sleeve or chambered casting 18, provided upon one side thereof with a semicylindrical lug 19, longitudinally slotted, recessed, or chambered upon its outer face to receive and contain the vertically-movable plunger 20, which is of greater diameter than the width of the lateral opening or slot of its containing-chamber, thereby preventing lateral displacement thereof. This plunger of cylindrical form has two lateral wings 21 and 22, each of which has an oblique or inclined face 23, adapted to be engaged by the extended inner end 24 of the power-shaft hereinafter described. The said plunger is also provided upon its opposite extremities with the terminal lugs 25 and 25', adapted to alternately engage proper slots in the said gear-wheels. The gear-wheels 11 and 12 are each provided with a concentric horizontal flange or web 26, arranged adjacent to the inner edge of the teeth of said wheels, as shown in Fig. 2, upon or against which the ends of the said plunger are adapted to alternately ride or travel. Each of the said webs 26 is also provided with a curved slot 27 to receive the lugs 25 and 25', respectively, of the said plunger. These slots 27 are so arranged as to be in register at the moment of shifting the engagement of said plunger with said wheels. In proper recesses in said casing near the opposite end of said plunger-chamber are arranged suitable coil-springs 31, with their forward end bearing against the adjacent face of said plunger to overcome its gravity when in its uppermost limit of adjustment for the purpose hereinafter described.

It is well known that when the fly-wheel in a machine of this kind is accidentally or inadvertently rotated in a reverse direction it will break the operative parts of the machine. To avoid this, I mount the fly-wheel 13 loosely upon the outer end of the power-shaft 6. In a suitable opening in the fly-wheel hub I loosely arrange a spring-pressed pawl or dog 28, whose outer end is adapted for a holding engagement with a proper notch in the said power-shaft, as shown in Fig. 6, when the said wheel is rotated in the desired direction, but which slides freely over the power-shaft without causing any rotation of the same when the fly-wheel is rotated in the reverse direction. The notch in the power-shaft which is thus engaged by the said pawl is preferably crescent-shaped, as shown. Against the outer end of the said pawl 28 in said opening is arranged a coil-spring 29 of proper tension. The said opening is then closed by a screw plug or cap 30, by which both the pawl 28 and the spring 29 are securely held in position.

The operation of my improvement thus described will readily be understood and briefly stated is as follows: The operator rotates the power-shaft 6 continuously in one direction—in this instance toward the right—thereby driving the gear-wheels 11 and 12 in opposite directions by means of the actuating-pinion 31. As the chambered casting 18 is fixed upon the agitator-shaft 15, it is obvious that its direction of rotation is determined by the gear-wheel with which the said plunger is at the time engaged. The alternating movement or rotation of the agitator-shaft is produced by a continuous rotation of the power-shaft, as follows: Suppose the winged plunger 20, for example, to be in a locked engagement with the lower gear-wheel 12, which is produced by the lug 25' on the lower end of said plunger resting in the said slot 27 of said wheel, the lug 25 on the upper end of said plunger bearing against the lower face of the flange or web 26 of the upper gear-wheel 11, thereby preventing any derangement of such engagement. Assuming the rotation of the power-shaft to be toward the right, the rotation of the gear-wheel 12 and of the shaft 15 during the above engagement will of course be toward the left, and when the wheel 12 makes a complete revolution the extended end 24 of the power-shaft will be in contact with the oblique face 23 of the wing 21 of said plunger, thereby elevating the same and causing a locked engagement of the lug 25 with said slot 27 in the upper gear-wheel 11, at the same time releasing its engagement with the said wheel 12, thereby instantaneously reversing the direction of rotation of said agitator-shaft until the gear-wheel 11 makes a complete revolution, thereby bringing the oblique face 23 of the lower wing 22 of said plunger into engagement with the end 24 of the power-shaft, thereby forcing the plunger downward again into engagement with slot 27 of the wheel 12, as before, and at the same instant releasing its engagement with the wheel 11, and thus reversing the direction of rotation of the agitator-shaft. This operation is indefinitely continued, as the plunger can in no instance pass the end 24 of the said power-shaft. As the wheels 11 and 12 travel in opposite directions, the plunger 20 must pass over the slot 27 in the wheel 12 at each one-half revolution when it is engaged with the wheel 11, and the plunger is prevented from dropping by gravity into said slot at each half-revolution. The action of the springs 32 keeps the said plunger so tightly pressed against the walls of its chamber as to overcome its gravity and prevent its displacement or disengagement until actuated by the said power-shaft, as described.

The operation of reversing the direction of rotation of the agitator-shaft is thus simple, positive, and reliable, and the reversing mechanism or plunger is actuated by a moving part—the power-shaft—instead of employing a pivoted pawl actuated by a fixed part, as heretofore.

The operating-handle is so placed upon the fly-wheel relative to the reversing mechanism that the handle is always on the downstroke when the reversal takes place, which materially increases the ease of operation.

Having thus described my invention, what I desire to secure by Letters Patent is—

1. In an alternating mechanism, an upright agitator-shaft; oppositely-rotatable gear-wheels loosely mounted upon said shaft, and each having a slotted web; a vertically-movable plunger mounted upon said shaft; and means for alternately throwing the said plunger into engagement with the slots of said gear-wheels, the parts being combined to operate substantially as shown.

2. In an apparatus of the class specified, an agitator-shaft, a pair of oppositely-rotatable gear-wheels rigidly secured to said agitator-shaft; means for actuating said gear-wheels; a vertically-movable plunger in fixed relation to said shaft; and means for alternately throwing said plunger into engagement with said wheels.

3. An upright shaft; oppositely-rotatable gear-wheels mounted upon said shaft; means for operating the two gear-wheels, a longitudinally slotted or chambered casting fixed upon said shaft intermediate said wheels, a winged plunger vertically adjustable therein; and means for alternately throwing the said plunger into engagement with said wheels, the parts being combined to operate substantially as shown.

4. An upright rotatable agitator-shaft, two oppositely-rotatable gear-wheels secured to said shaft, means for operating the two gear-wheels; a vertically-movable plunger carried by a support fixed upon said shaft intermediate said wheels; and a power-shaft whose inner end projects into the path of said plunger and is adapted to alternately throw the said plunger into engagement with the said gear-wheels, the parts being combined to operate substantially as set forth.

5. The combination of two oppositely-rotatable gear-wheels slotted as shown; means for operating said gear-wheels, a shaft to which the wheels are secured, a fixed casting for a movable plunger; a vertically-movable plunger mounted in said casting as shown and adapted for a holding engagement with the said wheels alternately; and means for actuating said plunger at a predetermined limit of its rotation.

6. The combination of a vertical agitator-shaft; a pair of oppositely-rotatable gear-wheels mounted upon said shaft; means for operating the wheels, a plunger-casting fixed upon said shaft intermediate said wheels; a vertically-movable plunger mounted in said casting and adapted to normally engage one or the other of said wheels; a power-shaft, an actuating-pinion secured to the inner end of the power-shaft, and in gear with said wheels and having its inner end projecting into the path of said plunger and adapted to alternately throw the same into engagement with said gear-wheels.

7. Oppositely-rotatable gear-wheels each of which has a slotted web for the locking-plunger; an agitator-shaft rotatably mounted in suitable bearings and carrying said gear-wheels; a chambered casting fixed upon said shaft as shown; a vertically-movable plunger mounted in said casting; a power-shaft in parallel relation with the line of travel of said wheels, an actuating-pinion in mesh with said gear-wheels and having its inner end arranged in the path of travel of said plunger, and adapted to alternately shift or adjust said plunger into a locked engagement with said gear-wheels alternately.

8. A mechanism for alternately reversing the direction of rotation of the agitator-shaft in washing-machines, the agitator-shaft, a vertically-movable plunger mounted thereon, and oppositely-rotatable gear-wheels secured to said shaft, combined with a suitable obstruction upon the plunger which is adapted to be alternately shifted or adjusted into engagement with the gear-wheels, substantially as set forth.

9. The combination of oppositely-rotatable gear-wheels; a shaft carrying said wheels; a chambered casting 18 fixed upon said shaft; a vertically-adjustable plunger 20 having lugs and wings or guides whose oblique faces are adapted for an actuating engagement with a relatively-fixed projection in their path of travel; and means for alternately adjusting said plunger into engagement with said gear-wheels.

Signed by me at Fort Wayne, Allen county, State of Indiana, this 13th day of February, A. D. 1899.

SYLVESTER P. GREY.

Witnesses:
ADELAIDE KEARNS,
WILLIAM F. KESSLER.